United States Patent [19]

Grindon

[11] Patent Number: 4,871,256

[45] Date of Patent: Oct. 3, 1989

[54] MEANS FOR PROJECTING PATTERNS OF LIGHT

[75] Inventor: John R. Grindon, Hazelwood, Mo.

[73] Assignee: LBP Partnership, St. Louis, Mo.

[21] Appl. No.: 44,057

[22] Filed: Apr. 29, 1987

[51] Int. Cl.⁴ .............................................. G01B 11/24
[52] U.S. Cl. .................................................... 356/376
[58] Field of Search ................... 356/376; 353/95, 117

[56] References Cited

U.S. PATENT DOCUMENTS

| | | | |
|---|---|---|---|
| 3,866,052 | 2/1975 | DiMatteo et al. | 356/2 |
| 4,187,011 | 2/1980 | DiMatteo et al. | 356/376 |
| 4,357,108 | 11/1982 | Stern et al. | 356/376 |
| 4,668,984 | 5/1987 | Rosenfeld | 356/376 |
| 4,687,326 | 8/1987 | Corby | 356/376 |

Primary Examiner—Richard A. Rosenberger
Attorney, Agent, or Firm—Haverstock, Garrett & Roberts

[57] ABSTRACT

A projector for selectively projecting patterns of light onto a remote object, one use of which is in conjunction with a system to establish measurements of the surface characteristics of the object, the projector including at least one light source and associated lens assembly mounted to project light onto the remote object, and a rotatable mask member having two or more segments, each segment a distinctive optical pattern, which mask can be rotated as to position a selected one of the segments between the light source and the projection lens assembly whereby when light is directed through the selected segment the light projected onto the remote object will be modified by the optical pattern on that segment. The projector may have two or more spaced light sources and associated projection lens assemblies, and the mark rotatable therebetween to produce distinctively different patterns of light impinging on the remote object when the respective light sources are illuminated, the patterns of light projected on the object when a selected mask segment is positioned in the path of one of the light sources when it is illuminated being angularly related to the pattern of images projected on the object when that same segment is positioned between a second light source and second lens and that second light source is illuminated.

30 Claims, 4 Drawing Sheets

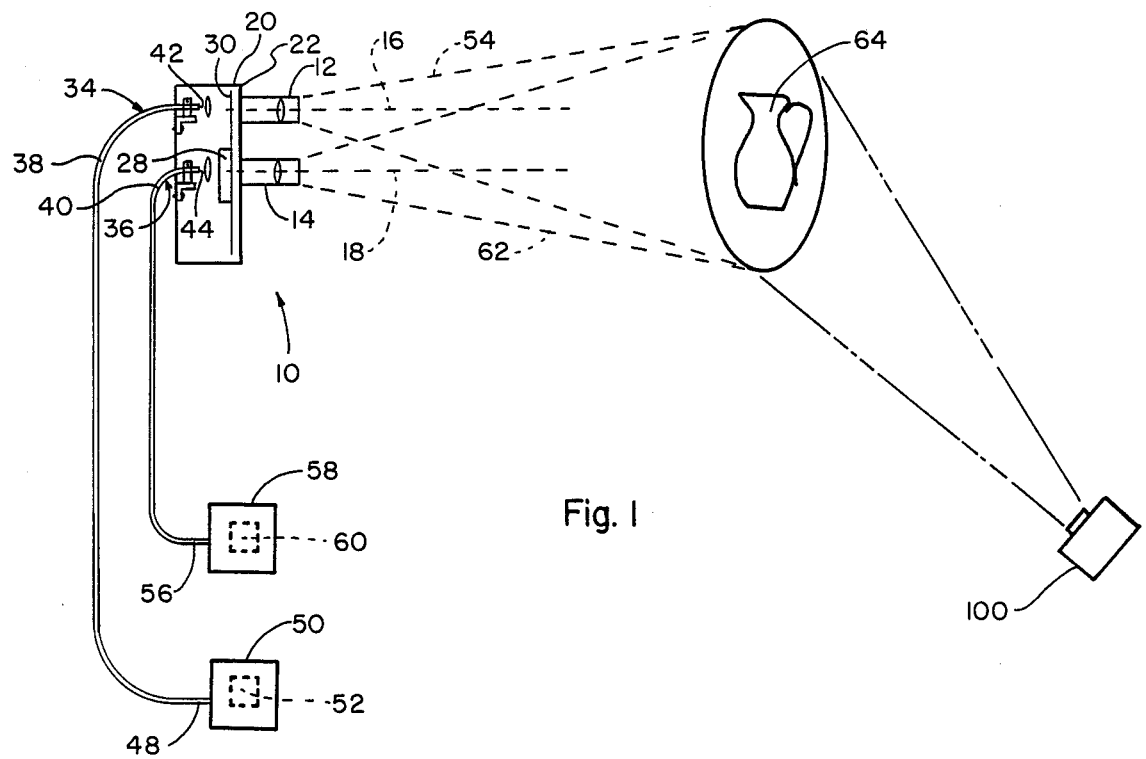
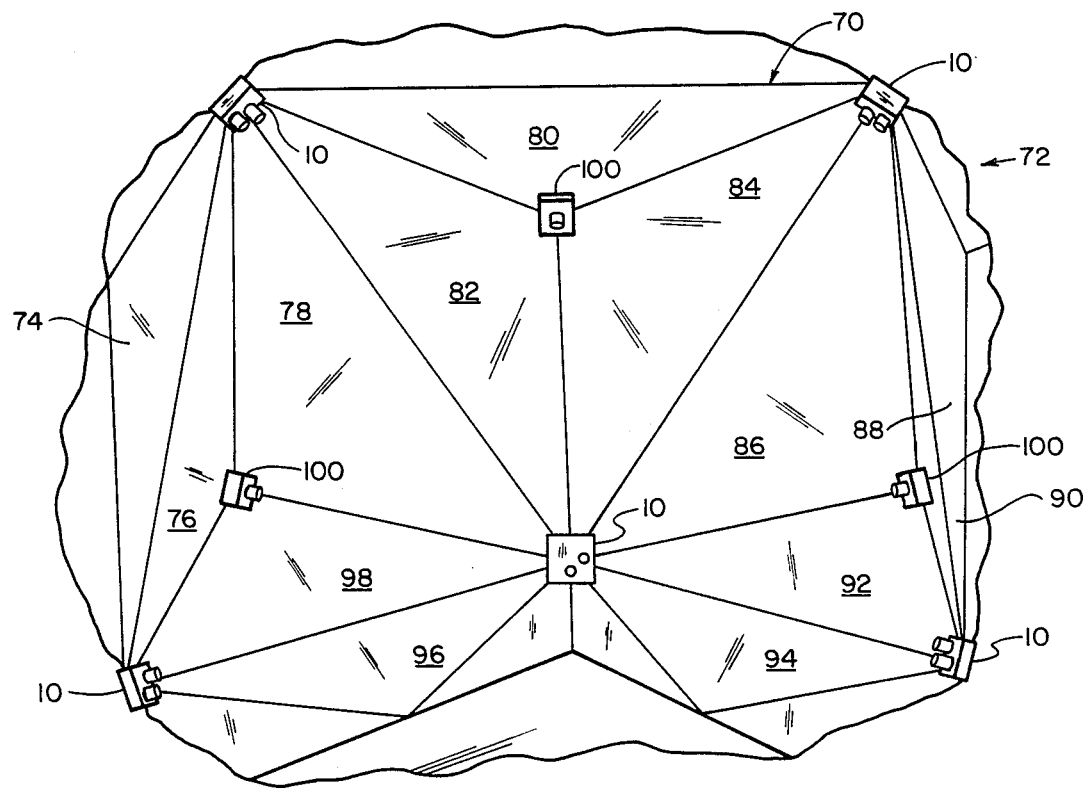
Fig. 1
Fig. 2

MEANS FOR PROJECTING PATTERNS OF LIGHT

Several different means have been devised for producing three-dimensional representations of objects for various purposes including three-dimensional reproduction of the human form. In the early days such reproduction were made by sculptors working in stone and other mediums and in more recent times reproductions have been produced using plaster casts, triangulation methods, and methods which include photographing an object from different angles and combining the photographic reproductions and by holography. There is a need, however, for a device capable of producing three-dimensional representations of an object by processing signals derived from images of optical patterns projected onto the object. The present invention resides in the construction of a projector intended for use in conjunction with such systems and devices or any other application for which selected ones of multiple patterns or selected portions of a pattern must be projected in a controlled or known manner.

The subject projector includes novel means for projecting optically patterned light beams sometimes also referred to as optically modulated light beams from one or more projector devices onto an object or person whose surface form or shape is to be represented, or for such other purpose as may be desired, for example in an intended application where such projections may be observed by one or more sensing devices such as video cameras having means associated therewith to generate images that can be registered to a system of coordinates. The thus registered images can then be used for purposes desired such as to produce a data record which can thereafter be used in aforementioned means to produce a three-dimensional representation of the surface form of the object or person. The present invention relates specifically to the construction of a light pattern projector device having one or more light sources and associated lens assemblies for projecting patterned light beams. Any two such patterns or different parts of a pattern may differ in the distribution of light intensity or color or other distinguishing measure. The present projector includes a rotatable disc member having patterned areas, the patterns formed by employing different degrees of light attenuation, the patterns arranged thereon in a circular manner, and the projector further includes one or more light sources and associated strobing means located on one side of the disc member such that the light projected from the light source or sources passes through a predetermined pattern segment on the disc as the disc rotates between the light source or sources and the respective lens assemblies. The respective lens assemblies are located on the opposite side of the disc from the respective light sources and are focused on the remotely located object to be illuminated thereby. The light source or sources are strobed so that they produce light or light flashes at different distinct times and through predetermined portions of the disc, thereby selectively projecting predetermined pattern segments. In the present invention, the separate light source or sources are strobed to project different optically encoded light patterns on the disc onto the object at succeeding strobe times. Each projector as shown has two strobed light sources and associated lens assemblies in this case positioned 90° apart relative to the patterns on the disc so that the light patterns projected by the separate lens assemblies are oriented at right angles to each other and impinge at right angles to each other on the object. In the application mentioned, the use of two or more different projection orientions such as this permits more accurate three-dimensional representations than would be attainable with only a single projection orientation.

The present invention will be described in connection with the construction and operation of one strobed light source and associated lens assembly with the rotatable disc positioned therebetween, and it will also be described in connection with a projector that has two spaced strobed light sources and associated lens assemblies located to project patterns on the disc 90° apart. The particular form of the patterns on the disc can vary widely but the use of predetermined patterns generally is important to the invention. For example, in one application of the invention, when one portion or segment of the pattern is projected by one portion of the projector, the pattern projected is in a zebra type coding made up of alternate light-conducting and non light-conducting areas on the disc. The effect is to project a pattern of adjacent elongated dark and light areas onto the object.

The same types of optically encoded patterns are projected by the other lens assembly on the subject projector and the same requirements for the light edges are also true. However, for the second lens assembly, on the same projector, the projected images, even when using the same patterned disc, will be oriented at a different angle. In particular for the example described, the angle will differ by ninety degrees to the aforesaid projected images. This means, for example, that if one lens assembly projects zebra light patterns oriented vertically onto the object then the other lens assembly will project zebra light patterns oriented horizontally onto the object. The images of projections from each assembly can then be viewed by differently positioned cameras such as video cameras. Such cameras can be used in association with circuitry including computer circuitry which can be used to gather and record or store information that can be used to represent the three-dimensional surface form. The information thus stored or recorded can then be used for a wide variety of purposes such for example to control means such as sculpting or replicating means to produce a three-dimensional reproduction of the object. It should also be noted that as a general rule differently located cameras will be used to view the different light patterns on the object as projected by the different projector portions so that all or any desired portion of the object can be measured and/or stored or recorded.

It is a principal object of the present invention to provide relatively simple novel projector means capable of being strobed to project predetermined patterns at distinct times and at a predetermined orientation onto an object.

Another object is to provide a projector capable of projecting different patterns at different times and at different orientations onto an object.

Another object is to teach the construction of a light projector capable of projecting distinctively encoded images using a single rotatable disc having patterns of light conducting and non-conducting areas arranged thereon in an annular pattern of optically encoded images.

Another object is to provide a rotating transparent disc member having a circular optically encoded pattern formed thereon by spaced light conducting and non-light conducting areas and to use the disc to encode light beams passing through the disc member at spaced time intervals and locations during rotation thereof.

Another object is to use a disc drive assembly to rotatably support a disc member having an annular pattern thereon formed by encoded transparent and opaque areas.

Another object is to expose an object to be represented in three-dimensional form to light beams produced by light from strobed light sources passing through encoded patterns on a rotating disc.

Another object is to provide relatively simple and easy to operate means from which data relating to the physical characteristics including the three dimensional shape of an object can be gathered and used or stored for later use.

Another object is to provide relatively inexpensive projector means for use in producing data relating to the physical characteristics and shape of a three-dimensional form.

These and other objects and advantages of the present invention will become apparent after considering the following detailed specification of a preferred embodiment of the subject device in conjunction with the accompanying drawings.

BRIEF DESCRIPTION OF THE DRAWINGS

FIG. 1 is a schematic perspective view of a projector device constructed according to the teachings of the present invention;

FIG. 2 is a front elevational view showing a portion of the inside of an enclosure with locations for several of the subject projectors and associated cameras;

DETAILED DESCRIPTION OF THE INVENTION

Figure 3:
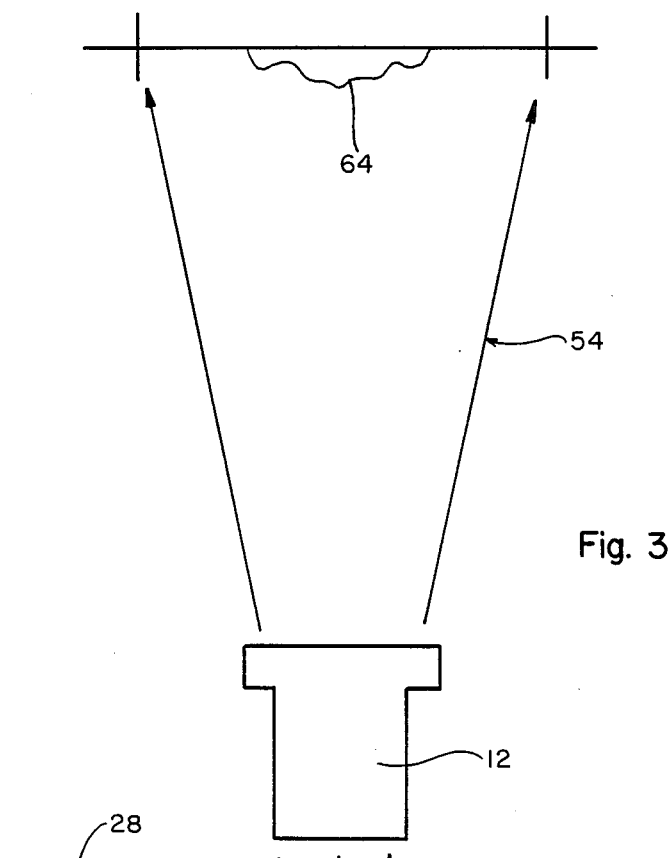
FIG. 3 is a diagrammatic side elevational view of one of the light sources and associated lens assembly for the subject projector illustrating the general shape of the envelope of the optical beam projected thereby.
Figure 4:
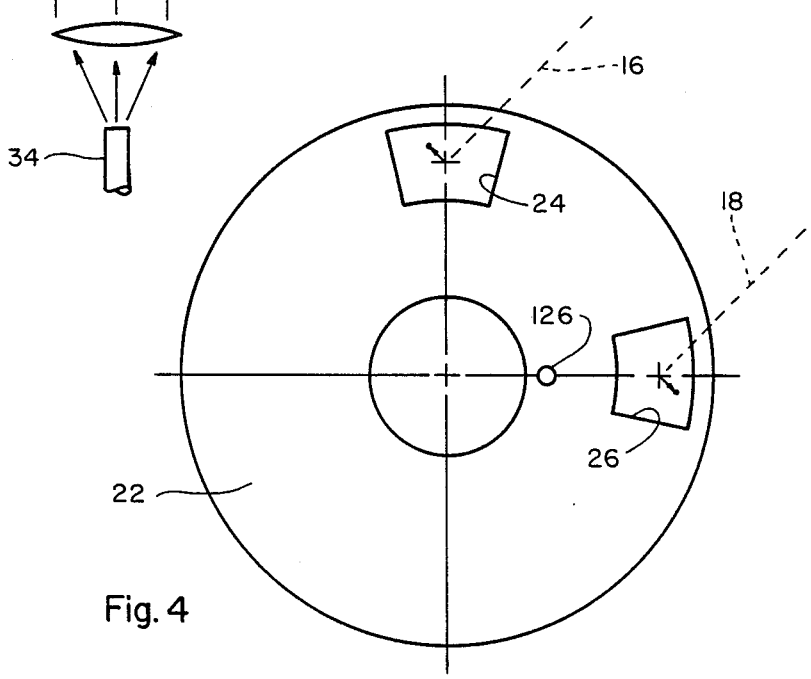
FIG. 4 is a front view of an apertured wall member on the housing for the subject projector.
Figure 5:
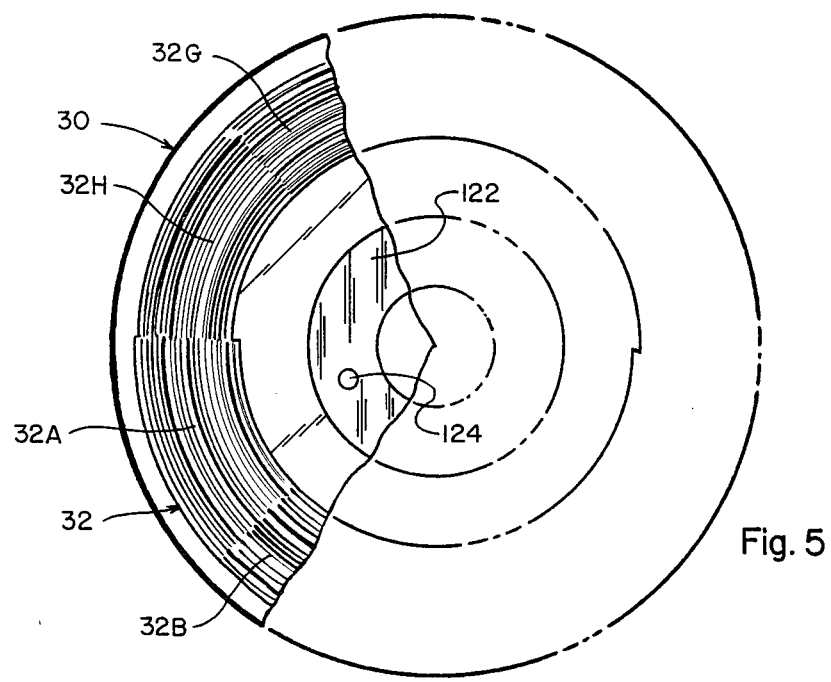
FIG. 5 is a view of a rotatable disc member having a circular pattern of optically encoded images formed thereon for use in the subject projector.
Figure 6:
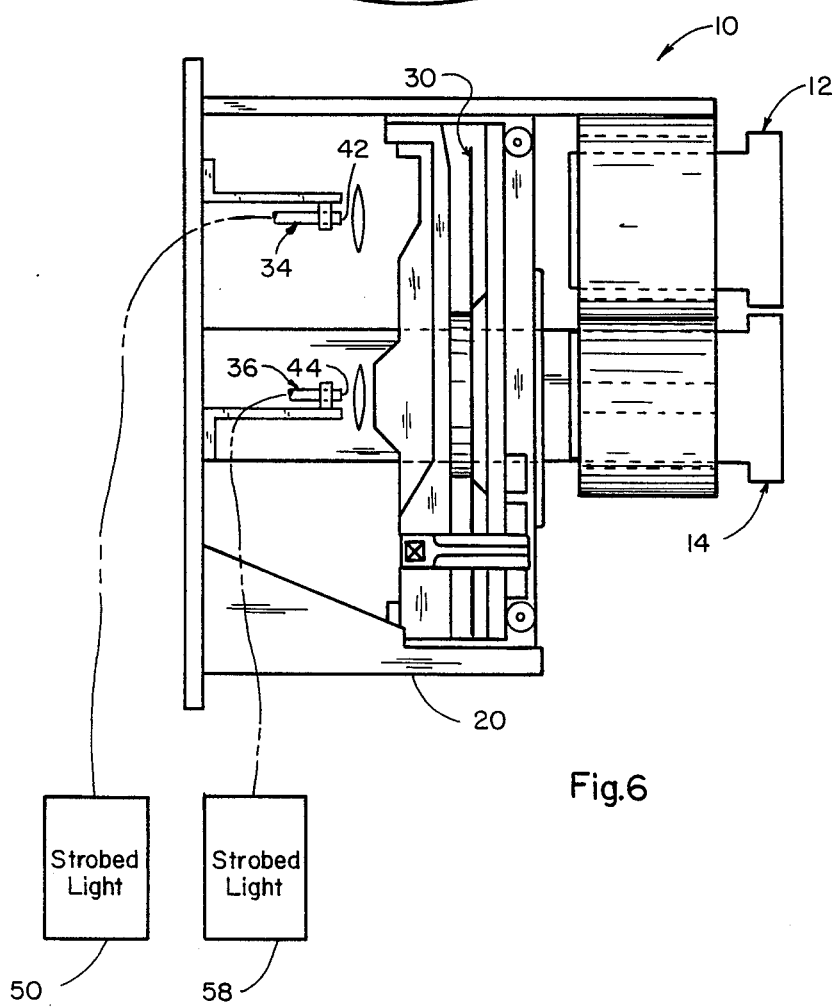
FIG. 6 is an enlarged side elevational view partly in section showing more of the details of the subject projector.

Referring to the drawings more particularly by reference numbers, FIG. 1 shows a light projector 10 constructed according to the teachings of the present invention. In its preferred form the projector 10 has two spaced lens assemblies 12 and 14 which have their respective optical axes 16 and 18 oriented parallel to each other. The lens assemblies 12 and 14 are mounted on a support structure or housing 20 which includes an apertured front wall 22 that has a pair of spaced openings 24 and 26 (FIG. 4) located therein and in alignment with the respective lens assemblies. The openings 24 and 26 are shown in FIG. 4 as being more or less trapezoidal in shape, although other shapes may be used as well, with the opening 24 aligned or substantially aligned with the optical axis of the lens assembly 12 and the opening 26 aligned or substantially aligned with the optical axis of the lens assembly 14. The wall 22 is shown for illustrative purposes having a circular shape, and a rotatable assembly 28 is mounted in the housing 20 and supports a patterned disc member 30 which is also shown as being round and in the example shown has a distinctive annular pattern 32 (FIG. 5) formed by position encoded light conducting and light non-conducting areas arranged on one surface thereof, and at a location to be aligned during rotation with the openings 24 and 26 in the wall 22. The annular encoded pattern 32, one example of which is shown in FIG. 5, is shown formed of eight (8) equal length arcuate segments 32A–32H with the encoding varying from segment to segment and from groups of segments to groups of segments. The positional encoding of the transparent and opaque areas in the segments is important to the purpose of this example, and in general the particular patterns employed are important to applications for which the subject projectors are used.

Located in the housing 20 on the opposite side of the disc 30 from the respective lens assemblies 12 and 14 are respective light apertures 42 and 44 which may in general be any light apertures but shown here as substantially point sources. The light apertures 42 and 44 may be supplied by light sources located on or adjacent to the optical axes 16 and 18 of the respective assemblies in the housing 20 or they may be, as shown, supplied through optical fibers such as optical fibers 38 and 40 which have respective ends 42 and 44 located in alignment with the annular encoded area 32 on the disc 30, and also at locations aligned with the respective openings 24 and 26 formed in the wall 22. Light exiting the optical fibers 38 and 40 at their respective end faces 42 and 44 will pass through the annular coded area 32 on the transparent disc 30 at spaced locations, and through the respective lens assemblies 12 and 14.

Referring again to FIG. 1, the optical fiber 38 has its opposite end 48 coupled to a light housing 50 which encloses a light source 52 which is strobed to flash at certain specific times as will be shown. The light produced by the strobed light source 52 passes through the fiber 38 exiting from the end surface 42 thereof where it passes through the particular segment 32A–32H of the encoding 32 on the disc 30 in alignment therewith and is projected by the lens assembly 12 to produce flashes of encoded light or light beams 54 onto a remote object 64. In a like manner, the optical fiber 40 has its opposite end 56 coupled to another light housing 58 which encloses another light source 60 which likewise is strobed but normally at different times to produce light flashes that pass through the optical fiber 40, through the same or through a different encoded area 32 of the disc 30, and through the lens assembly 14 which projects the encoded light 62 onto the same object 64. The light on successive flashes of the same light source that forms each of the beams 54 and 62 generally passes through differently patterned portions of the same annular area 32 and the light flashes from the different light sources flash typically at 90° from each other as shown. This means that the light encoding projected by the beam 54 will be oriented at right angles relative to the light encoding projected by the beam 62. As already mentioned, the projector can employ a single light source and projection lens in applications where two or more such assemblies are not necessary.

As will be explained more fully hereinafter, one of the main end uses for the projector 10 is to project spatially patterned light onto an object such as one whose surface is to be measured and later reproduced or recorded in a three-dimensional form for some purpose. To this end, the light patterns projected on the object can be sensed and recorded photographically or electronically as by one or more cameras such as film cameras or video cameras properly located and oriented to see the light that falls on the object by the beams or portions thereof from their different vantage points. It will then be possible using the recorded data to produce signals that can be used for some desired purpose such as to control the operation of a sculpting or profiling device which actually makes the three-dimensional reproduction of the surface form of the object. In order to accomplish this using the present projector, it is necessary for best operation that the pattern of the encoded light projected by the separate lens assemblies 12 and 14 on the projector 10 be sharply focused on the object, and the projected patterns from both lens assemblies should preferably be concentric or nearly concentric in the plane of the object onto which the light is projected. It is also necessary, as already indicated, to have the light images projected by the lens assembly 12 oriented at some angle, and preferably at a right angle, to the orientation of the light images projected by the lens assembly 14. Since the optical axes of the lens assemblies 12 and 14 are preferably oriented on the projector housing 20 parallel to each other, some adjustment of the locations of the light sources 34 and 36 relative thereto, especially if point light sources are used, may be necessary to overcome parallax substantially so that the light images projected by the different lens assemblies 12 and 14 will be concentric in the plane of the object. In an actual device using one or more of the subject projectors for sculpting or other purposes, the lateral distance between the lens assemblies 12 and 14 may be for example about four inches apart while the distance from the the projector 10 to the object 64 will be for example in the range from about 35 to 45 inches. Both of these dimensions can vary widely. To make the patterns of the projected light beams 54 and 62 concentric at this distance, it is necessary, when using point light sources, to shift the positions of the light sources 34 and 36 a slight distance away from each other and from their respective optical axes 16 and 18, see the arrows in FIG. 4. Shifting the positions of the light sources in this manner is usually easier and produces a better result than trying to change the orientation of the optical axes 16 and 18 of one or both lens assemblies 12 and 14 and results in fewer manufacturing problems. It is possible, however, and contemplated, to change the orientation of the optical axes of the lens assemblies slightly to accomplish this purpose, and such is clearly within the scope of the present invention. It is also possible to use larger light sources such as strobe lamp or light bulb sources in which case shifting the positions of the light sources generally is unnecessary.

Referring to FIG. 2, there is shown a portion of an interior wall 70 of a polyhedron shaped housing structure 72 formed by a plurality of adjacent angularly related connected wall panels, some of which are identified as panels 74–98. The polyhedron shaped housing structure is disclosed in co-pending design applications Ser. Nos. 022,329 and 022,340, both filed March 5, 1987. The housing 72 is enclosed on all sides including also on top and bottom to form a light tight enclosure, and one side (not shown) will be modified to include an access entrance through which a person or object can move or be moved. The entrance will also be used by operator and maintenance personnel. The paneled construction of the housing 72 establishes positions for locating a plurality of similar projectors 10 and a plurality of cameras such as video cameras 100. In FIG. 2, positions for 5 of 6 projectors 10 and for 3 cameras are shown. The present application is directed to the construction of the projectors 10 and to a lesser extent to the manner in which the projectors are used. All of the projectors mounted in the housing 72 will normally have the same construction as described. The reason for having five (or more) projectors 10 spaced as shown around the inside of the housing 72 is to enable illuminating the object from enough directions so that sufficient signals can be produced during a single sitting by the cameras and associated circuits to be able to more fully represent the object in accurate three-dimensional form. The means for producing signals that can be used for controlling a sculpting or reproduction device or for any other purpose is disclosed and claimed in Applicant's co-pending application Ser. No. 044,992, filed April 29, 1987, now Pat. No. 4,846,577 and is not the subject of this application. Rather, this application is concerned with a means for projecting predetermined patterns of light. The various cameras 100 employed are located in the housing 72 to view selected portions of the images projected on an object from their different vantage points so as to be able to record sufficient information from which it will be possible to generate the signals necessary to represent the three-dimensional form of the object.

Each of the various projectors 10 mounted in the housing 72 includes housing 20 with positions for the two spaced light sources 34 and 36, two spaced lens assemblies 12 and 14, and a rotatable structure 28 for rotatably supporting the light encoded disc member 30 positioned to have its encoded area movable in the space between the light sources and their respective lens assemblies. In the preferred embodiment the respective light sources and lens assemblies are oriented to view the patterned area on the disc at 90° from each other. This means that when the respective light sources are strobed, preferably at different distinct times, the light produced thereby will pass through the disc pattern at a location that is in position at that time, and will project patterned light beams onto the object. Thus, each light source and its associated lens assembly will project optical patterns differently encoded by different portions of the encoded area 32 with the patterns projected by one projector portion being oriented at right angles relative to the patterns projected by the other projector portion. This is important in certain operations in which the subject projectors are used.

If the coded area 32 on the disc 30 is subdivided, for example, into eight equal length arcuate encoded segments, each somewhat differently encoded as shown in FIG. 5, the light beams or flashes of light will be encoded according to the particular segment which is in position between a strobed light source and its associated lens assembly. This means that if the same light source is strobed repeatedly but through differently encoded segments 32A–32H on the disc 30, as will be the usual case when using the subject projectors in a device for producing three-dimensional representations of objects, the successive strobes will produce differently optically encoded light beams formed by zebra-like patterns, and the locations of the opaque and transparent areas of the encoding for each segment will be very important. In this regard, the opaque portions will create corresponding shadows on the object and the transparent portions will allow projected light to fall on the object. It should be clear, however, that it is not necessary that the encoded areas be opaque and transparent for the device to work. It can therefore be seen that a series of position encoded lines or edges formed by and between adjacent lighted and shadowed areas on the object will be projected. The successive flashes associated with each different light source and its associated lens assembly will produce a multiplicity of zebra-like light patterns on the object and these will be photographically or electrically viewed by the different camera means that can see the light patterns and recorded on a suitable raster either for immediate or for later use. The same situation will occur for all of the strobed light sources and lens assemblies on the various projectors. The construction of the projector is at the heart of the present invention.

Figure 7:
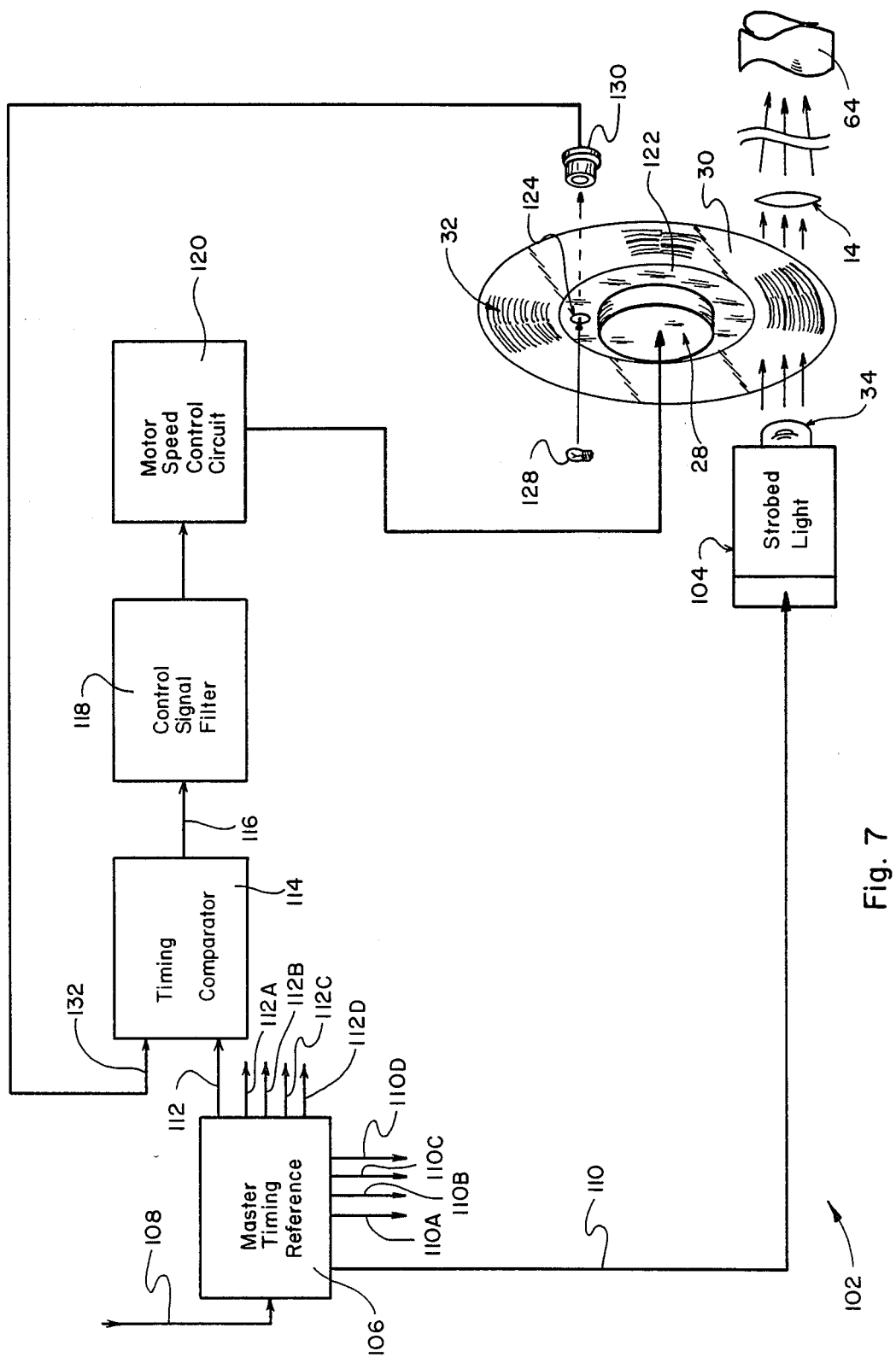
FIG. 7 is a functional diagram mostly in block form showing one possible way to control the subject projector.

FIG. 7 is a block diagram showing one of many possible forms of circuit 102 for controlling the subject projector. In the form shown, there are rotatable disc drive means 28 for rotating the disc 30 and a strobe light control means 104 which is provided to flash or strobe the light source 34 (or 36). The circuit 102 is shown as including a master timing reference block 106 which is connected to receive inputs from an optional external control source or input 108. The master timer 106 has a plurality of outputs including output 110 which is connected to the strobed light control means 104 to cause flashes of light to be produced for passing through selected portions of the coded area 32 on the disc 30 and through the associated lens system 12 (or 14) to the object 64. Alternatively, other means, such as mechanically, electroptically, or acusto-optically shuttering or interrupting the flow of light from a continuous source or one which cannot be strobed with sufficient speed, at any point between the light source and the object, is contemplated, and does not alter the essential elements of the invention. Another output 112 of the master timer 106 applies timing signals as inputs to a timing comparator 114 which in turn has an output 116 connected to feed signals to and through a filter circuit 118 to a motor speed control circuit 120. The motor speed control circuit 120 is connected to and controls the rotatable drive 28 which rotates the disc 30.

The disc 30 has an opaque area 122 with a transparent index area 124 which is used for indexing purposes. The stationary housing wall 22 (FIG. 4) has an aperture 126 which periodically registers with the transparent index area 124 during rotation of the disc 30. A lamp 128 is positioned on one side of the aperture 126 and a photo detector 130 is positioned on the opposite side of the wall 22 in alignment with the aperture 126. This means that as the disc 30 rotates, once each rotation the area 124 will register with the aperture 126 and when this occurs, light from the lamp 128 will reach the photo detector 130 and this will produce a second signal on input 132 to the timing comparator circuit 114. These signals are compared to the signals received on the input 112 and used to synchronize the angular position of the disc drive 28 to the flashing of the strobe light 34 (or 36).

The same master timer 106 can also be used to control the disc drives and strobes in other similar projectors. This is indicated in FIG. 7 by other outputs 110A-D and 112A-D. As already noted, each of the projectors can have one or more strobed light sources and all can be under control of the same master timer.

Thus there has been shown and described a novel projector that fulfills all of the objects and advantages sought therefor. It will be apparent to those skilled in the art, however, that many changes, modifications, variations and other uses and applications for the subject projector are possible, and all such changes, modifications, variations and other uses and applications which do not depart from the spirit and scope of the invention are deemed to be covered by the invention which is limited only by the claims which follow.

What is claimed is:

1. A projector for projecting energy onto a remote object comprising a projector housing having an opening therein, a rotatable assembly mounted in the housing, a mask member mounted on the rotatable assembly and having arcuate areas arranged in an annular pattern, each arcuate area being formed of spatially variant light conductivity forming a pattern thereon, the pattern of each area on the mask member being formed of a plurality of elongated arcuately extending energy conducting and energy non-conducting portions forming distinct energy edges therebetween, the positions of the energy edges in at least one of the areas being at different distinct locations therein than the energy edges in any other area, means for rotating the rotable assembly with the mask member thereon, a radiant energy source having an energy producing portion located in the housing on one side of the mask member in alignment with the housing opening, means to project radiant energy flashes from the energy source through selected ones of the arcuate areas on the mask and through the housing opening for projection onto the remote object, and means to synchronize the timing of the energy flashes with the rotation of the mask member so as to project portions of different ones of the predetermined arcuate areas of the pattern which have the energy edges therein at distinctively different positions.

2. The projector of claim 1 wherein the energy source is a light source.

3. The projector of claim 1 wherein the energy source is a light source that includes at least one optical fiber having a first end projecting into the housing and an opposite end remote therefrom, a light associated with the opposite fiber end.

4. The projector of claim 3 wherein the optical fiber has one end aligned with the opening in the housing, a light producing member adjacent the opposite fiber end, and means to strobe the light producing means to produce timed light flashes synchronized to occur when selected ones of the areas are positioned adjacent to the housing opening.

5. The projector of claim 1 including means focusing the patterns of energy onto the object.

6. The projector of claim 1 wherein the energy conducting and energy non-conducting portions on at least some of the said arcuate areas are located radially on the mask member so that energy edges formed by and between adjacent energy conducting and non-conducting portions when projected on the remote object are not contiguous between such areas.

7. The projector of claim 1 wherein the housing has mask drive means located therein, the mask member being a round energy conducting mask having a segmented annular pattern of areas each formed of elongated energy conducting and non-conducting portions formed thereon.

8. The projector of claim 1 including an enclosed structure formed by a plurality of similar adjacent panel sections enclosing an energy tight space therewithin, said panel sections forming a plurality of corners, and means for mounting projectors at selected ones of the corners formed by adjacent panel sections.

9. The projector of claim 1 including an enclosed structure formed by a plurality of similar adjacent panel sections enclosing a radiant energy tight space therewithin, said panel sections forming a plurality of corners, means for mounting projectors at selected ones of the corners and means for mounting camera devices at selected other of said corners.

10. The projector of claim 9 wherein the cameras are video cameras.

11. The projector of claim 1 wherein the energy source is substantially a point energy source.

12. The projector of claim 1 wherein the energy source is a light bulb.

13. The projector of claim 1 wherein the energy source is a strobed lamp.

14. The projector of claim 1 wherein the energy source is a laser.

15. The projector of claim 1 wherein means are provided to shutter the radiant energy from the energy source to produce the energy flashes.

16. The projector of claim 1 including means to synchronize the timing of the strobing of the energy source to occur at a particular position during rotation of the mask member.

17. The projector of claim 1 wherein the radial positions of the energy conducting and energy non-conducting portions of the respective areas are determined in accordance with a code which differs from area to area.

18. The projector of claim 1 wherein the mask member is a disc rotated about its center.

19. The projector of claim 1 wherein the outline of the patter has the form of an annulus centered on the axis of rotation.

20. A projector comprising a housing having at least two spaced openings located therein, a rotatable assembly mounted in the housing including means thereon to support a light conducting disc having patterns located thereon in position to move past the spaced housing openings, respective light sources mounted on one side of the disc in position to produce light adjacent each of the housing openings, a lens assembly mounted on the opposite side of the disc from each respective light source and constructed to focus the light produced by the respective light sources onto a predetermined remote location, and means to project flashes of light from each of the light sources through respective portions of the pattern on the disc and through the respective spaced housing openings for projecting and focusing onto an object positioned at the remote location.

21. The projector of claim 20 wherein the light sources are substantially point light sources.

22. The projector of claim 20 wherein the optically encoded images on the disc are arranged in an annular pattern formed by a plurality of elongated arcuate shaped light conducting and non light conduction areas.

23. The projector of claim 22 wherein the annular pattern of optically encoded images are segmented into a plurality of substantially equal length distinctively different arcuate segments.

24. The projector of claim 20 wherein the light sources are light bulbs.

25. The projector of claim 20 wherein the light sources are strobed lamps.

26. The projector of claim 20 wherein means are provided to shutter the light from the respective light sources to produce light flashes.

27. The projector of claim 20 wherein the light source is a laser.

28. The projector of claim 20 wherein the positions of the respective light sources are offset relative to the optical axes of the respective lens assemblies to compensate for parallax at the focal distance of the lens assemblies.

29. A projector for projecting patterns of light onto a remote object, which projected patterns enable establishing measurements as to the shape of the surface of the object, said projector including at least two light sources and associated lens assemblies positioned at shaped locations mounted to project light from the light sources onto the remote object, a film member having a distinctive pattern of optical images recorded thereon and positioned in alignment with the light sources and the lens assemblies whereby when the respective light sources are illuminated, the light therefrom will pass through a portion of the distinctive pattern of optical images onto the remote object, and means for moving the film member relative to the light sources and lens assemblies so that different portions of the optical images will be projected onto the remote object.

30. The projector of claim 29 including means to project flashes of light from the respective light sources through predetermined locations of the pattern on the mask and means to synchronize the light flashes to predetermined positions of the film member.

* * * * *

UNITED STATES PATENT OFFICE
CERTIFICATE OF CORRECTION

Patent No. 4,871,256    Dated October 3, 1989

Inventor(s) John R. Grindon

It is certified that error appears in the above-identified patent and that said Letters Patent is hereby corrected as shown below:

Column 3, line 34, "diagrammatic" should be --diagramatic--.

Column 9, line 37, "patter" should be --pattern--.

Column 10, line 34, "shaped" should be --spaced--.

Signed and Sealed this

Eleventh Day of September, 1990

*Attest:*

HARRY F. MANBECK, JR.

*Attesting Officer*     *Commissioner of Patents and Trademarks*